United States Patent [19]

Kroger

[11] 4,296,834

[45] Oct. 27, 1981

[54] FOLDING SAWHORSE

[76] Inventor: Walter Kroger, P.O. Box 331, Custer, S. Dak. 57730

[21] Appl. No.: 44,454

[22] Filed: Jun. 1, 1979

[51] Int. Cl.[3] .................. F16M 11/00

[52] U.S. Cl. .................. 182/155; 182/181; 182/225

[58] Field of Search .................. 182/155, 181–186, 182/224–227; 108/133

[56] References Cited

U.S. PATENT DOCUMENTS

| | | | |
|---|---|---|---|
| 2,544,989 | 3/1951 | Garibaldi | 182/155 |
| 2,725,269 | 11/1955 | Oakes | 108/133 |
| 3,225,865 | 12/1965 | Downey | 182/155 |

*Primary Examiner*—Reinaldo P. Machado

*Attorney, Agent, or Firm*—Blair, Brown & Kreten

[57] ABSTRACT

A folding sawhorse having an improved leg brace and storage hasp means. The sawhorse is of a type having two sets of leg pairs hingedly connected to a sawhorse top and having a brace extendable between each leg pair and the sawhorse top. The leg pairs are moveable between a folded orientation parallel with, and a set up attitude substantially normal to, the sawhorse top for, respectively, the sawhorse folded storage state and set up position. In the set up position, the tops of the leg pairs abut the underside of the sawhorse top to limit movement of the leg pairs in one direction. The leg pair braces when locked in position prevent movement of the leg pairs in the other direction. According to a preferred embodiment, a resilient brace is provided for each sawhorse leg pair. Brace locking means holds each brace in a state of compression between its associated leg pair and the sawhorse top whereby the brace continuously exerts pressure on the leg pair and the sawhorse top to urge the leg pair top into abutment against the underside of the sawhorse top and thereby provide a highly stable folding sawhorse. The preferred embodiment storage hasp includes a screw eye staple extending from the underside of the sawhorse top. The leg pair braces in essence form double, overlapped hasp tongues. A slot in each of the leg pair braces provides passage therethrough of said staple and a hook on one of the braces engages the staple to secure both of the leg pairs and their associated braces in an orientation parallel to the sawhorse top and provide a compact sawhorse which is easy to handle and store in a folded storage state.

14 Claims, 11 Drawing Figures

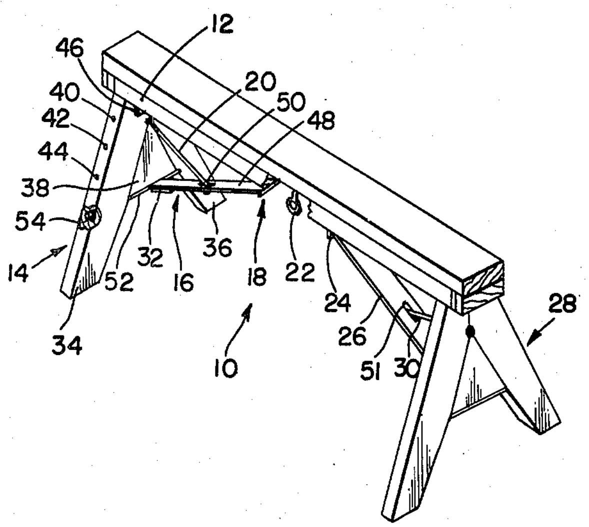
FIG. 1
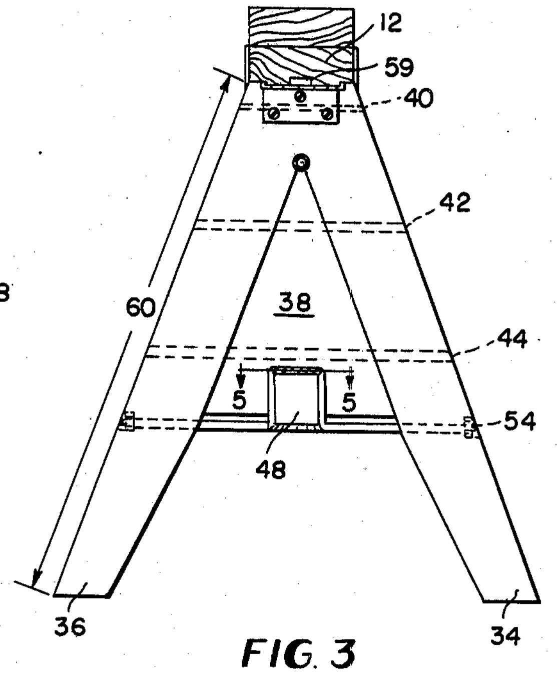
FIG. 3
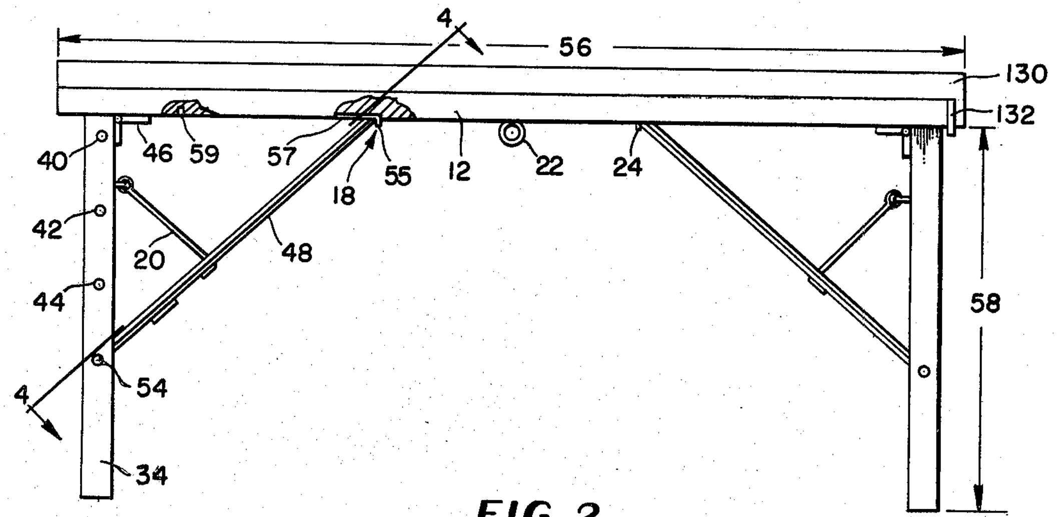
FIG. 2
FIG. 4
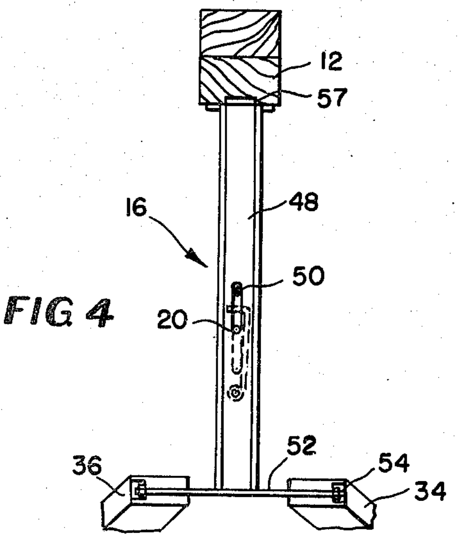
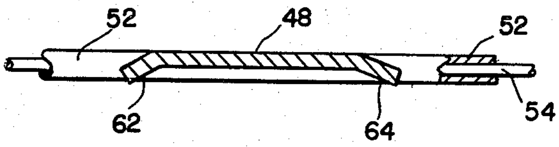
FIG. 5

FOLDING SAWHORSE

BACKGROUND AND FIELD OF THE INVENTION

The invention relates in general to sawhorses and in particular to that class of sawhorses known as folding sawhorses.

Folding sawhorses per se are old and well known devices. It has long been recognized that it is highly desireable to fold the legs of a sawhorse parallel with the sawhorse top for transportation and storage. Considerable effort and money has been put forth towards perfecting a folding sawhorse. Examples representative of such endeavors are the inventions set forth in the following U.S. Pats: J. W. Downey, No. 3,225,865, Dec. 28, 1965; J. R. Martin et. al. No. 3,177,974, Apr. 13, 1965; H. P. Weinkauf, No. 2,485,178, Oct. 18, 1949; E. S. Garibaldi, No. 2,544,989, Mar. 13, 1951; and, F. B. Swanson, No. 3,286,788, Nov. 22, 1976.

Each of the foregoing inventions includes two sets of leg pairs hingedly connected to the sawhorse top. Each leg pair set is attached to an end of the sawhorse top. When the sawhorses are in a set up position, the leg pairs correspond to their counterparts of a conventional non-folding sawhorse and are substantially normal to the sawhorse top. All of the above prior art folding sawhorses include a brace which extends between a leg pair and the sawhorse top. In the sawhorse folded storage state the leg pairs and braces have an orientation parallel to the sawhorse top. Transition between the sawhorse set up position and folded storage state requires the leg pairs and braces to either or both pivot and slide. Inevitable to such movement is friction and concomitant wear of the moving parts. Typically such wear results in a decrease in the stability of the sawhorse in a set up position.

A general object of the invention is to provide a sawhorse which is equivalent in performance to a conventional non-folding sawhorse yet which folds easily and compactly for transportation and storage.

Another object of the invention is a folding sawhorse which is highly stable in a set up position.

A further object of the invention is a folding sawhorse which tends to compensate for wear of its moving parts.

An additional object of the invention is a brace which provides high structural rigidity yet also functions as part of a storage hasp for securing the leg pairs and braces to the sawhorse top in the sawhorse folded storage state.

Still another object of the invention is a folding sawhorse incorporating a storage hasp which positively secures the leg pairs and their associated braces to the sawhorse top.

Yet an additional object of the invention is a folding sawhorse having a storage hasp which is of a conventional, standard, easily understood and operable construction.

BRIEF DESCRIPTION OF THE INVENTION

Briefly, the invention comprises a folding sawhorse having a top, a set of leg pairs hingedly attached to each end of the top, a brace extendable between each leg pair and the top, and brace locking means. Each brace is resilient along its length. To lock a brace in place in the sawhorse set up position, the brace must be bowed in order for it to snap into place in the brace locking means. The brace locking means holds the brace in a state of compresssion whereby the brace continuously exerts pressure against its associated leg pair and the sawhorse top to provide a highly stable folding sawhorse. According to the preferred embodiment, the braces are pivotally secured to the leg pairs and include a dual purpose slot strategically placed along the brace length for passage therethrough of the staple portion of a storage hasp when the leg pairs and braces are folded parallel to the sawhorse top with the braces overlapping. The slots also serve to engage a brace interlock hook when the sawhorse is in a set up position. The brace interlock hook is similarly a dual purpose device. In addition to providing further brace locking means, the hook engages the brace and a leg pair in a manner which adds to the structural strength and stability of the sawhorse. The storage hasp of the preferred embodiment is essentially a conventional hasp. The hasp staple is a screw eye protruding from the underside of the sawhorse top. The braces with their slots as above described are tongues of the hasp and an ordinary hook riveted to one of the braces in position to snugly engage so much of the screw eye as protrudes through the overlapped slots of the braces completes the hasp.

BRIEF DESCRIPTION OF THE DRAWINGS

FIG. 1 is a perspective view of a preferred embodiment of a folding sawhorse according to the present invention;

FIG. 2 is a front view of the sawhorse of FIG. 1;

FIG. 3 is an end view of the sawhorse of FIG. 2;

FIG. 4 is a sectional view taken along line 4—4 of FIG. 2;

FIG. 5 is a sectional view taken along line 5—5 of FIG. 3;

DETAILED DESCRIPTION OF THE INVENTION

Figure 6:
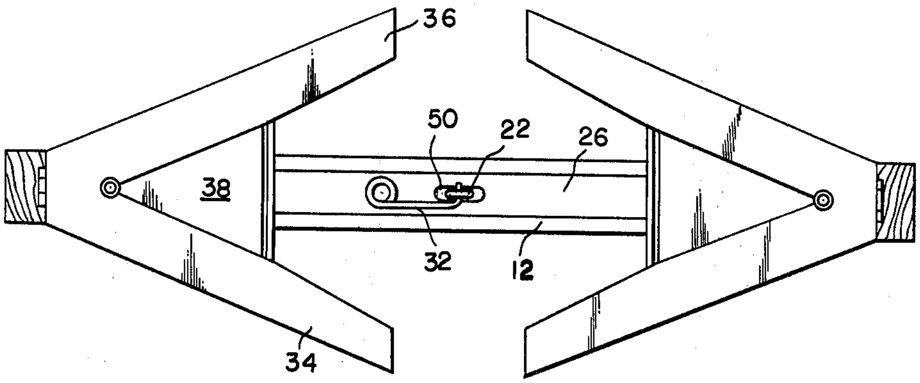
FIG. 6 is a bottom view of the sawhorse 10 of FIG. 1 in a folded storage state.

FIG. 1 is a perspective view of a preferred embodiment sawhorse, shown generally as 10, according to the present invention. Sawhorse 10 includes a top 12, a leg pair shown generally as 14, a brace shown generally as 16, a brace locking means shown generally as 18, brace interlock 20, a hasp staple in the form of a screw eye 22, brace locking means 24, brace 26, a leg pair shown generally as 28, and brace interlock 30. Sawhorse 10 is symmetrical about screw eye 22 with a single exception; namely, only one of the braces, brace 16, includes a storage hasp fastener hook 32. Because of such otherwise identicalness, only leg pair 14 and brace 16 shall be described in detail. Leg pair 14 includes leg 34, leg 36, and centerpiece 38. Legs 34 and 36 are joined together directly by dowel 40 and indirectly through centerpiece 38 by dowels 42 and 44. Hinge 46 hingedly connects leg pair 14 to top 12 and also serves to join the tops of legs 34 and 36. Brace 16 includes an elongate arm 48. Arm 48 is resiliently flexible along its length and includes a slot 50 for accepting the hooked end of interlock brace 20, and carries thereon the aforementioned storage hasp fastener hook 32. Slot 50 is not readily visible in FIG. 1 but its counterpart slot 51 in brace 26 is. The remainder of brace 16 comprises a journal pipe 52 and bearing shaft 54 the latter of which is visible in the cutaway area of leg 34. FIGS. 2 and 3 are side and end views of the sawhorse 10 of FIG. 1. FIG. 2 is partially cut-away to show the profile of brace locking means 18. Brace locking means 18 has an L-shaped profile and includes a downwardly protruding portion 55 and a recessed portion 57. Also visible in a partially cutaway area of FIG. 2 is a slot 59. Slot 59 is for accepting the head of the eye bolt of brace interlock 20 when leg pair 14 is folded parallel to top 12. FIGS. 2 and 3 are to scale and, for reference purposes, the sawhorse length and leg heighth are, respectively, designated as 56 and 58 in FIG. 2 and the leg 34 length designated as 60 in FIG. 3. Actual dimensions for 56, 58 and 60 are set forth in the Table of Components below. Further details of the brace 16 are provided in FIGS. 4 and 5, sectional views along line 4—4 of FIG. 2 and line 5—5 of FIG. 3, respectively. FIG. 5 is a cross-section through arm 48 from which it can be seen that the arm sides each include a bent edge, edges 62 and 64. Edges 62 and 64 add rigidity to arm 48 and hence add to the sawhorse stability.

FIG. 6 is a sawhorse 10 in a folded storage state with arm 48 of brace 16 overlapping the arm of brace 26 (as is apparent at the partially cut away portion of arm 48). Slot 50 of arm 48 and the corresponding slot of brace 26 are over the storage hasp staple screw eye 22 and the end of the storage hasp hook 32 is inserted into the screw eye to provide a compact folded sawhorse for storage or transportation. To use a sawhorse 10, hook 32 is removed from screw eye 22. Leg pairs 14 and 28 are pivoted to a set up position in which their tops abut the underside of top 12 as shown in FIG. 2. Leg pair 14 is locked into a highly stable condition by pivoting brace 16 upwards until its free end contacts locking means 18. Then brace 16 is bowed until the arm 48 free end snaps past downwardly protruding portion 55 to a final rest position on recessed portion 57. Locking means 18 is thus a two level catch. The first level is the downwardmost point of portion 55 and prevents passage of the brace 16 arm 48 free end absent a significant force to bow arm 48. The second level is the underside of recessed portion 57. Precision fabrication of the sawhorse 10 results in brace 16 residing in a state of compression when positioned in the catch second level with its free end against recessed portion 57. In a state of compression, brace 16 continuously exerts pressure on leg pair 14 and top 12. Such continuous pressure provides a highly stable sawhorse. Added assurance of positive locking of brace 16 in place is obtained by snapping the hook end of brace interlock 20 into slot 50. Also, brace interlock 20 subdivides the triangle formed by arm 48 and the portions of leg pair 14 and top 12 extending from opposite ends of arm 48 to their point of abutment. Such subdivision adds to the structural rigidity and stability of the sawhorse.

FIGS. 2-6 are to scale.

Production sawhorses 10 are constructed from the materials set forth in Table 1 below.

TABLE 1 TABLE OF COMPONENTS top 12: 4 foot (1.22 m.) #1 select fir 2×4;
holding means 18: $1\frac{1}{2}\times 1$ inch (3.81×2.54 cm.) by $\frac{1}{8}$ inch (0.32 cm.) thick spring steel;
brace interlock 20: 5/16 inch (0.795 cm.) dia. by 6 inch (15.25 cm.) long hook having an eye bolt for attachment to centerpiece 38;
screw eye 22: $\frac{1}{4}$ inch dia. by $1\frac{7}{8}$ inch (4.76 cm.) long;
hasp hook 32: $\frac{1}{4}$ inch (0.635 cm.) diameter of $3\frac{1}{2}$ inch (8.89 cm.) long conventional hook riveted to arm 48;
legs 34&36: cut from #1 select fir 2×4's (actual dimensions are standard lumber measures of $1\frac{1}{2}\times 3\frac{1}{2}$ inches (3.81×8.89 cm.);
centerpiece 38: cut from #1 select fir 2×6 (actual dimensions are $5\frac{1}{8}$ inch, 13.02 cm., base and 6 $\frac{3}{4}$ inch, 17.15 cm., heighth);
dowels 40, 42&44: $\frac{1}{2}$ inch (1.27 cm.) dia. fir dowels cut to length after insertion;
hinge 46: steel, having $2\times 3\times \frac{1}{8}$ inch (5.08×7.62×0.32 cm.) flanges; each hinge flange is secured with three $1\frac{1}{4}$ inch (3.15 cm.) long #8 wood screws;
arm 48: $18\times 1\frac{1}{2}\times \frac{1}{8}$ inch (45.72×3.81×0.318 cm.) cold rolled steel; bends 62 and 64 extend the full length of the arm, are at about a 45 degree angle, and are about $\frac{5}{8}$ inch (1.55 cm.) wide; slot 50 is $1\frac{1}{2}$ inches (3,81 cm.) long by 3/16 inch (0.476 cm.) wide, centered between the arm 48 sides and starts 8 $\frac{3}{8}$ inches (21.27 cm.) from the arm free end;
journal pipe 52: $\frac{3}{8}$ inch (0.95 cm.) outside diameter, $\frac{1}{4}$ inch (0.635 cm.) inside diameter by 5 inch (12.7 cm.) long steel pipe;
bearing rod 54: $\frac{1}{4}$ inch (0.635 cm.) dia. by one foot (0.305 cm.) long steel bolt together with a 1/16 in. (0.159 cm.) wall thickness by $1\frac{1}{2}$ inch (3.81 cm.) long stainless steel bearing sleeve for each end;
dimension 56: 4 feet (1.22 m.);
dimension 58: $20\frac{1}{4}$ inch (51.44 cm.);
dimension 60: 21 $\frac{3}{4}$ inch (55.25 cm.);
cutting board 130: #1 select fir 2×4, 4 feet (1.22 m.) long;
clip 132: $1\frac{1}{2}\times 8\times \frac{1}{8}$ inch (3.81×20.32×0.32 cm.) cold rolled steel.

Fabrication and assembly of the foregoing components into a preferred embodiment sawhorse 10 shall be described below. The description on occasion refers to parts associated with leg pair 14, it being understood, however, that the description is equally applicable to parts associated with leg pair 28.

Fabrication of preferred embodiment sawhorses 10 includes cutting tops and leg blanks from 12 foot lengths of 2×4's with a 12 inch radial saw. Cutting of the leg angles and centerpieces is by means of cutting jigs made from a precision master pattern, using normal cabinetry shop standard good workmanship practices. The leg angles are cut again using the 12 inch radial saw. The centerpieces 38 are cut from 2×6's using the 10 inch table saw. Two cross-wise notches, such as the notch 51, and two countersunk areas in which to mount brace locking means 18 and 24 are routed into each top. The brace locking means areas are made longer than recessed portions 57 of the locking means to permit custom mounting of the locking means for maximum sawhorse stability. A screw eye 22 is inserted into the sawhorse top underside exact center. Initial insertion is until the eye protrudes about one inch. The exact protrusion is adjusted and set for each sawhorse at the time of final assembly. Holes are drilled in the legs and centerpieces as required for dowels 40, 42 and 44, again using a jig made from a master pattern. A one horse press drill is used. The outside of the lowermost hole in each leg is enlarged to a ⅝ inch diameter to a depth of ½ inch for acceptance of the nuts and washers used on bearing rod 54. The lowermost hole of each leg is press fit on the inside of the leg with the 1/16 inch wall thickness sleeves described in the Table above with respect to bearing rod 54. Assembly of a leg pair commences with gluing two legs and a centerpiece together in a press. Pinch dogs are inserted in a well known manner. After insertion of the pinch dogs the dowels are driven and glued in place. Dowel 40 is driven into the top hole of the two legs and cut to length. Dowels 42 and 44 are then glued and inserted in a similar manner with care being taken to insert them from opposite sides of the leg pair. Dowels 42 and 44 are similarly cut to size. After allowing the glue to dry, the pinch dogs are removed. A hole is drilled in the leg pair for attachment of brace interlock 20. This hole is centered at the apex of centerpiece 38. A drilling template is used to drill holes in the leg pair for attachment of a hinge 46 flange. A drilling template is also used to drill hinge flange holes in the ends of tops 12. This latter template locates the leg pair top outside edge 1½ in., and inside edge 3 in., from the end of top 12. The leg pairs and tops are painted with two coats of an alkyd, nontoxic paint having a 54.6% aliphatic hydrocarbon and driers 45.4% soya alkyd resin composition. Brace interlock 20 is bolted in place with the eye bolt head extending laterally across the leg pair so as to be horizontal when the leg pair is vertical. Preparation of a brace 16 sub-assembly includes shearing arms 48 from sheet stock and cutting lengths of journal pipe 52. Slots 50, a hole for attaching fastener 32, and the bends 62 and 64 are stamped into arms 48. All arms 48 are welded to a length of journal pipe 52 and hooks 32 are riveted to one-half of the arms 48, both of which welding and riveting operations are by conventional, state of the art methods. A bearing rod 54 is inserted through one leg of a leg pair, the journal pipe 52 threaded over the end of the rod and the rod then inserted through the other leg of the leg pair and lock washers and nuts added and tightened to secure the brace to the leg pair. Attachment of two sets of leg pairs to a top 12 using two hinges 46 and 1¼ inch #8 wood screws into the starter holes drilled with the drilling templates and custom attachment of the brace locking means and final adjustment of the screw eye 22 completes the assembly. Location of the locking means can be readily determined by swinging arm 48 until it comes to rest against the underside of top 12, with the associated leg pair top abutting top 12, marking the point of contact, and then attaching the locking means in a position to provide the desired state of compression of arm 48 as determined by trial and error.

Figure 7:
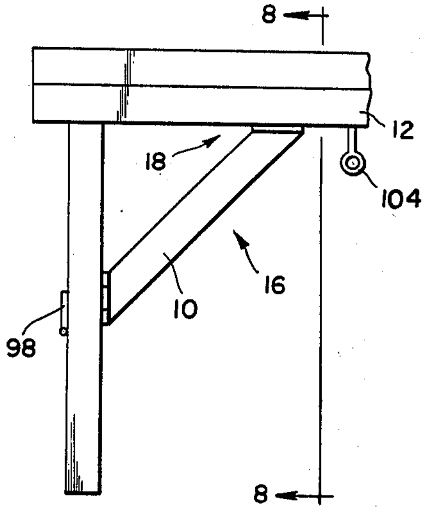
FIG. 7 is a fragmentary, front view of an alternative embodiment illustrating a different orientation of the brace and interlock portions of the generic invention disclosed and claimed herein.
Figure 8:
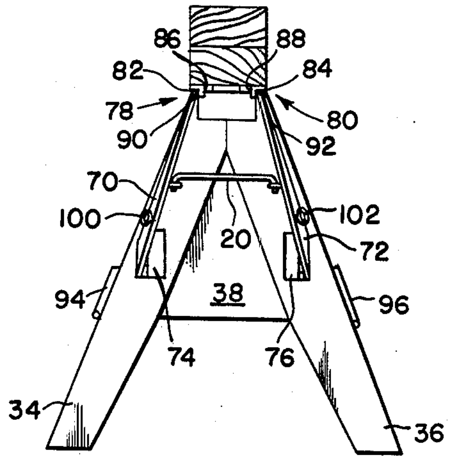
FIG. 8 is a sectional view taken along line 8—8 of FIG. 7.
Figure 9:
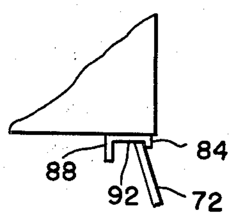
FIG. 9 is a detailed view of the brace locking means shown in FIG. 8.

Various hypothetical alternative embodiments of brace 16 and brace locking means 18 are shown in FIGS. 7–11. FIGS. 7 8 and 9 illustrate a brace 16 configuration in which a pair of brace arms 70 and 72 are mounted for pivotal movement around a vertical axis, specifically, around the axes of hinges 74 and 76. The brace locking means 18 of this embodiment is a channel, shown generally as 78 and 80, with sides of different lengths. The channel outer sides, sides 82 and 84, are shorter than the inner sides, sides 86 and 88. Such a configuration would allow snapping the free end of a brace arm past the outer side, side 82 or 84, first level by bowing of the arm to reside in a state of compression against the channel bottom, bottoms 90 and 92, but restrained against further inward movement by the channel inner side, side 86 or 88 as the case may be. Also included in the embodiment is an interlock brace 20 fixedly secured to one and releaseably engageable with the other of arms 70 and 72. The storage hasp comprises hooks 94 and 96 on legs 34 and 36, a hook 98 on centerpiece 38, and mating eyes on arms 70 and 72 and the underside of top 12, which eyes are designated as 100, 102, and 104.

Figure 10:
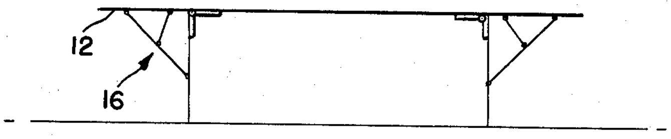
FIG. 10 is a schematic front view of an alternative embodiment of the present invention; and, FIG. 11 is a schematic front view of yet another alternative embodiment of the present invention.
Figure 11:
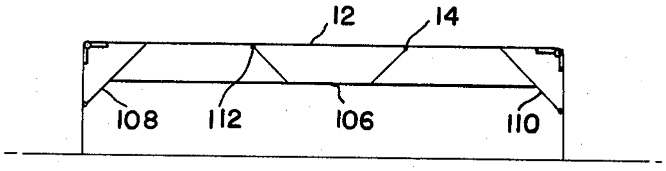

Schematic illustrations of two additional alternative embodiments are provided in FIGS. 10 and 11. A theoretical embodiment in which the braces 16 are pivotally connected to the top 12 is shown in FIG. 10 and an alternative brace interlock 106 bridged between braces 108 and 110 and releaseably connected to the top 12 at 112 and 114 is shown.

Having taught how to make and use the invention by means of the preferred embodiment and illustrate various species of the generic invention by means of the alternative embodiments, both of which, the preferred and the alternative embodiments, are given by way of illustration and not limitation and even further modifications of which are considered as within my generic invention, for example, again by way of illustration and not limitation, the brace interlock 20 of the preferred embodiment limitation, the brace interlock 20 of the preferred embodiment could be provided with a forked end or made to engage an eye in arm 48 to provide even further structural rigidity, rigidity in both directions along the length of the interlock, and brace locking means 18 could include manually adjustable positioning means to compensate for changes caused by wear of the various parts, the true scope of the invention is as set forth in the following claims.

What is claimed is:

1. In a folding sawhorse having a top, two sets of folding leg pairs, and a pair of braces of resilient material each associated with one of said sets of leg pairs, each of said braces pivotally mounted at one end on one of said associated leg pairs so as to extend between said associated leg pair and said top in the sawhorse set set up position, and brace locking means on said top engagable with the other end of each of said braces to retain said brace in a state of compression between said associated leg pair and said top with said sawhorse in a set up position, and interlock latching means for each of said braces, which interlock means extends rigidly between a brace and either a leg pair of said sawhorse top maintaining said brace in said state of compression to provide a highly stable folding sawhorse.

2. In a folding sawhorse according to claim 1, the improvement wherein said leg pairs fold between a position having the leg pair top against the underside of the sawhorse top in the set up position and an orientation in which the length of the leg pair is parallel with said sawhorse top in the sawhorse folded state and wherein said brace is resiliently flexible along its length and is pivotally secured at its end not engageable with said brace locking means and wherein said brace locking means includes a multi level catch a first level of which requires bowing of said brace for passage of the brace past said level and a second level of which maintains said brace in a state of compression whereby said leg pair top is held firmly and rigidly against the underside of the sawhorse top to provide a highly stable folding sawhorse.

3. In a folding sawhorse according to claim 2, the improvement wherein said brace locking means is positionable to compensate for expansion, contraction, wear, loosening and changes in the relationships between the sawhorse top and its associated leg pair and brace.

4. In a folding sawhorse according to claim 2, the improvement wherein each said leg pair is generally A shaped, includes a pair of braces each of which is pivotally attached to a generally vertical axis and which braces are attached to different ones of the legs of the leg pair and said brace locking means comprises a generally U shaped channel the bottom of which is attached to and extends generally along the length of the underside of the sawhorse top and forms said second level, and which channel sides depend from the sawhorse top and the channel side towards the outside of the sawhorse top forms said first level and the other of which channel sides depends further from said top than the channel side forming said first level.

5. In a folding sawhorse according to claim 2, the improvement wherein each said brace is a thin elongate strap of metal pivotally secured between the legs of a leg pair and said brace locking means is an L shaped piece the longer portion of which is attached to the sawhorse top and a protruding portion of which depends from said top at a position relative to the brace such that a slight bowing of the brace allows the end of the brace to snap over the protruding portion of the brace locking means and rest in a state of compression against said longer portion.

6. In a folding sawhorse according to claim 1, the improvement wherein said interlock means extends between a leg pair and its associated brace.

7. In a folding sawhorse according to claim 6, the improvement wherein said interlock means is pivotally secured to said leg pair and is releaseably attachable to said brace.

8. In a folding sawhorse according to claim 7, the improvement wherein said brace and interlock means include a mating hook and eye.

9. In a folding sawhorse according to claim 8, the improvement wherein said brace includes said eye and said sawhorse further comprises a storage hasp for holding said leg pairs in an orientation parallel to the sawhorse top in a folded storage state, and which storage hasp cooperates with each said brace eye to so hold each said leg pair.

10. In a folding sawhorse having a top, two sets of folding leg pairs, and a pair of braces, each of which braces is associated with a leg pair and extends between and is releaseably attachable to one or the other of said leg pair and said top in the sawhorse set up position and is positionable parallel with both its associated leg pair and the sawhorse top in the sawhorse folded storage state, and each of which braces together with a portion of a leg pair and a portion of the sawhorse top are the sides of a triangular structure, the improvement comprising means sub-dividing each said triangular structure into at least two parts by rigidly bridging two of said sides and being disengageable from at least one of said sides to permit folding of the leg parallel with the sawhorse top.

11. In a folding sawhorse according to claim 10, the improvement wherein said sub-dividing means extends between a leg pair and its associated brace.

12. In a folding sawhorse according to claim 11, the improvement wherein said sub-dividing means is pivotally secured to said leg pair and is releaseably attachable to said brace.

13. In a folding sawhorse according to claim 12, the improvment wherein said brace and sub-dividing means include a mating hook and eye.

14. In a folding sawhorse according to claim 10, the improvement wherein said sub-dividing means extends between the top and a leg pair.

* * * * *